(No Model.)  
F. MEISEL & H. C. FISCHER.  
ROTARY NUMBERING MACHINE.

No. 558,405. Patented Apr. 14, 1896.

5 Sheets—Sheet 1.

WITNESSES:  
A. E. Humiston.  
George A. Yeo.

INVENTORS  
Francis Meisel  
Hermann C. Fischer  
by P. E. Teschemacher  
Atty (No Model.)  5 Sheets—Sheet 2.

F. MEISEL & H. C. FISCHER.
ROTARY NUMBERING MACHINE.

No. 558,405.  Patented Apr. 14, 1896.

WITNESSES:
A. E. Humiston
George A. Yeo.

INVENTORS
Francis Meisel
Hermann C. Fischer
by F. E. Teschemacher
Atty.

(No Model.) 5 Sheets—Sheet 3.
F. MEISEL & H. C. FISCHER.
ROTARY NUMBERING MACHINE.

No. 558,405. Patented Apr. 14, 1896.

WITNESSES:
A. E. Humiston
George A. Yeo

INVENTORS
Francis Meisel
Hermann C. Fischer
BY
F. C. Teschemacher
ATTORNEY.

(No Model.) 5 Sheets—Sheet 4.
F. MEISEL & H. C. FISCHER.
ROTARY NUMBERING MACHINE.
No. 558,405. Patented Apr. 14, 1896.
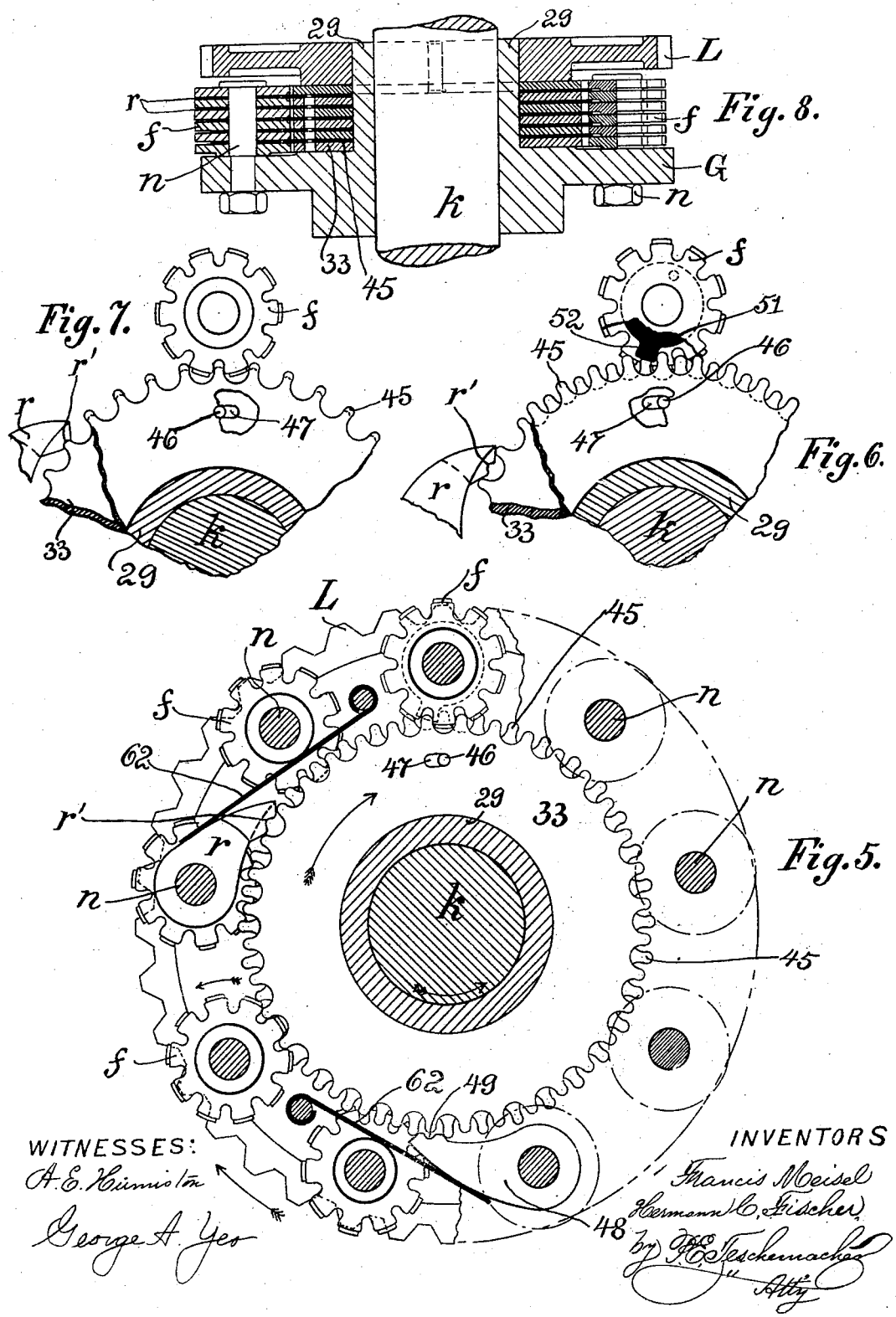
WITNESSES:
A. E. Hinniston
George A. Yeo
INVENTORS
Francis Meisel
Hermann C. Fischer
by Teschemacher
Atty

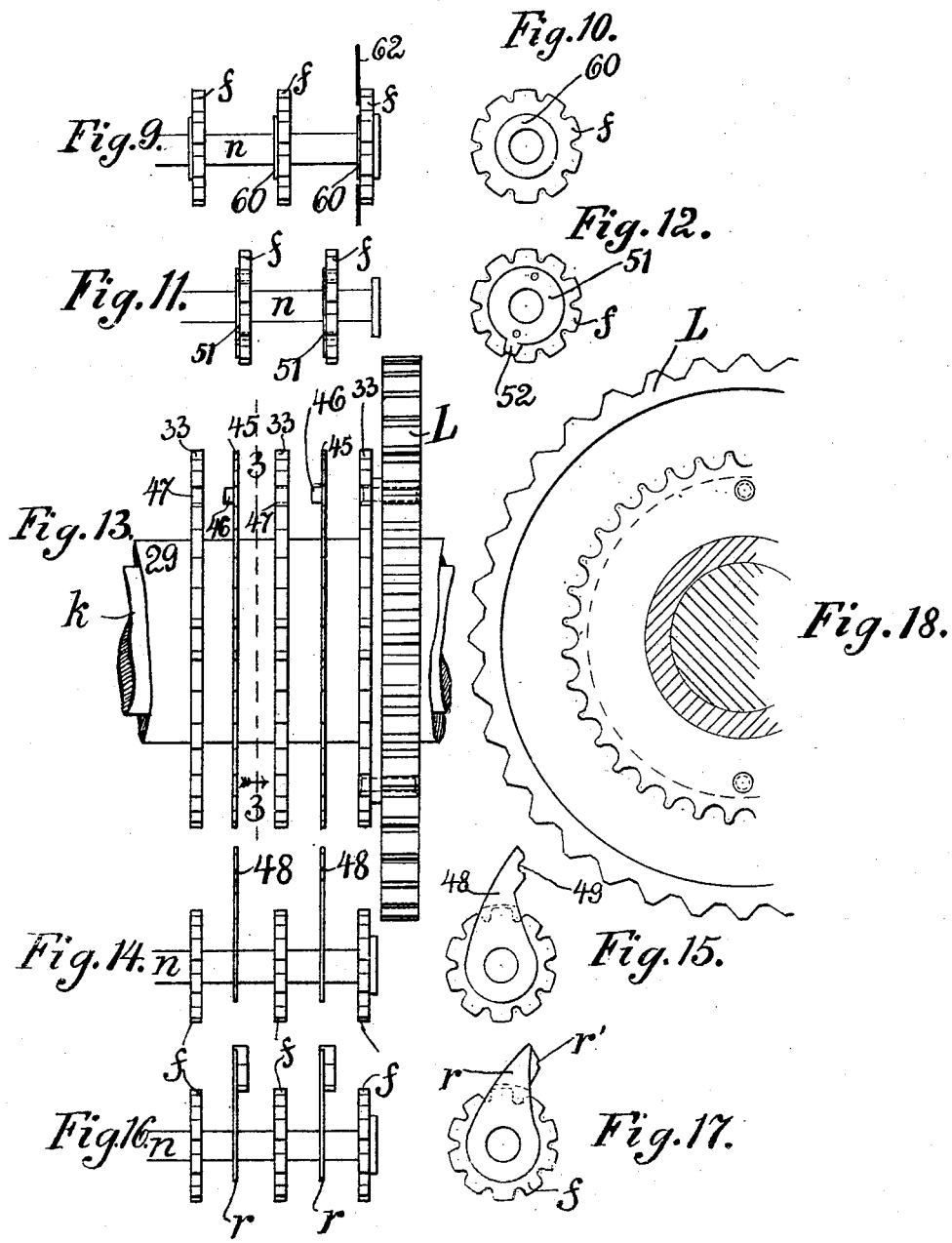

UNITED STATES PATENT OFFICE.

FRANCIS MEISEL AND HERMANN C. FISCHER, OF BOSTON, MASSACHUSETTS, ASSIGNORS TO THE KIDDER PRESS MANUFACTURING COMPANY, OF SAME PLACE.

ROTARY NUMBERING-MACHINE.

SPECIFICATION forming part of Letters Patent No. 558,405, dated April 14, 1896.

Application filed May 17, 1895. Serial No. 549,693. (No model.)

*To all whom it may concern:*

Be it known that we, FRANCIS MEISEL and HERMANN C. FISCHER, citizens of the United States, residing at Boston, in the county of Suffolk and State of Massachusetts, have invented certain new and useful Improvements in Rotary Numbering-Machines, of which the following is a full, clear, and exact description, reference being had to the accompanying drawings, making part of this specification, in which—

Figure 1:
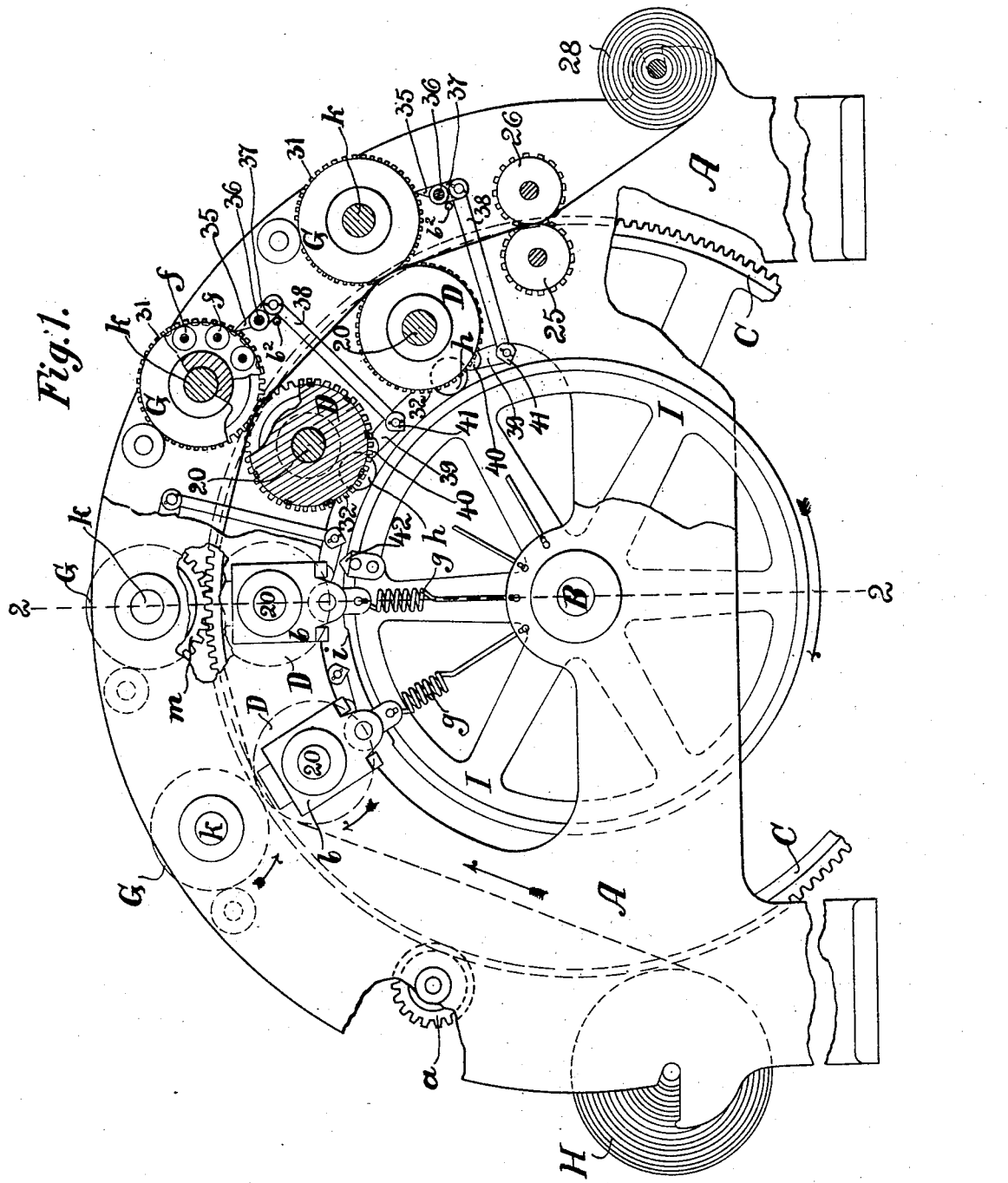
Figure 2:
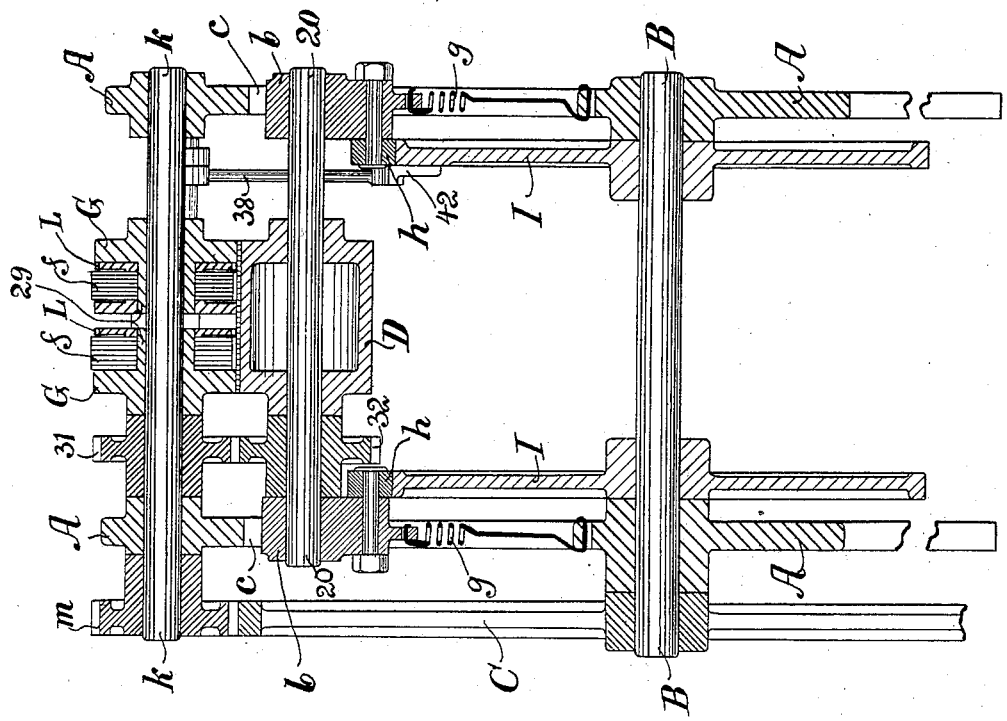
Figure 3:
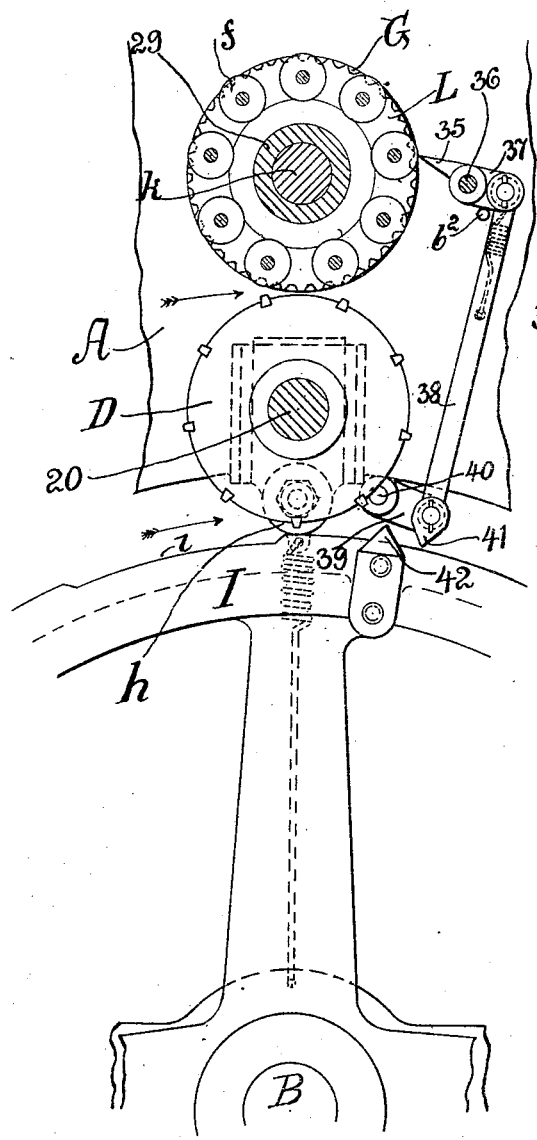
Figure 4:
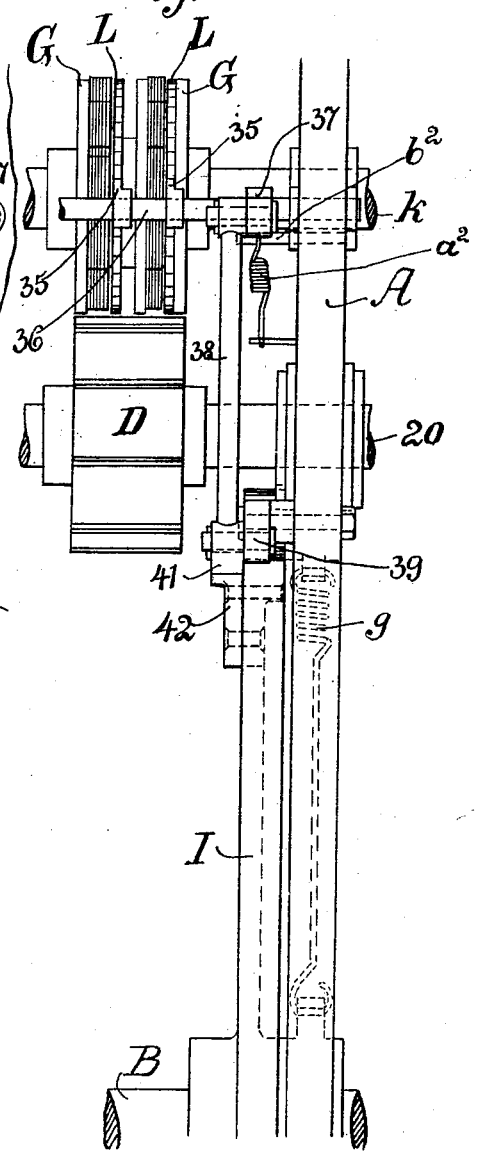

Figure 1 is a side elevation of our improved numbering-machine, a portion of the framework and mechanism being broken away to show the parts behind the same. Fig. 2 is a central vertical section of the same on the line 2 2 of Fig. 1. Fig. 3 is an enlarged sectional side elevation of a portion of the machine, showing the numbering-wheels and their carrying-disk, the impression-cylinder, the cam-wheel, and the mechanism for shifting the numbering-wheels. Fig. 4 is an end elevation of the same. Fig. 5 is an enlarged sectional elevation of one of the numbering-wheel carrying-disks, showing the sets of numbering-wheels thereon and their driving-gears, the section being taken on the line 3 3 of Fig. 13, looking in the direction of the arrow. Figs. 6 and 7 are details of the same. Fig. 8 is a section through the carrying-disk and numbering-wheels and their driving-gears shown in Fig. 5, the same being drawn on a reduced scale. Figs. 9, 10, 11, 12, 13, 14, 15, 16, 17, and 18 are details.

Our invention has for its object to provide a simple and effective rotary numbering-machine for printing numbers on a web of paper of any predetermined length and on which the same number can be repeated any predetermined number of times before the next consecutive number is brought into position to print, which number is then printed the same number of times as the preceding one, and so on as far as desired, the machine being thus particularly adapted for numbering railway-tickets or other matter composed of a plurality of detachable parts or sections, all of which are required to bear the same number. In many cases these numbers, owing to the sections or parts of the ticket being of small size or narrow width, require to be printed at very short distances from each other—often, for instance, half an inch or less apart—and to provide a machine which will accomplish this result in a simple and practical manner is a further object of our invention, which consists in certain combinations of parts and details of construction, as hereinafter set forth, and specifically pointed out in the claims.

In the said drawings, A represents the framework of the machine in suitable bearings, in which runs a shaft B, carrying a large gear C, which is adapted to be rotated by a driving-pinion $a$. (Shown in Fig. 1.)

The impression-cylinders D, of which there are four, arranged in the arc of a circle, in the machine here represented, have the journals of their shafts 20 mounted in boxes $b$, arranged to slide radially in suitable guideways $c$, Fig. 2, in the framework A toward and from the rotating disks G, which carry the several sets or series of numbering-wheels $f$, each box $b$ being connected with a spiral spring $g$, the opposite end of which is secured to the framework, as shown in Figs. 1 and 2, said springs serving to draw down the impression-cylinders and keep them out of contact with the numbering-wheels $f$ until the machine is ready to print the numbers, thus enabling the previously-printed tickets to be drawn from the web or roll H and passed between the several impression-cylinders and numbering-wheel-carrying disks to a pair of drawing-rolls 25 26, having the same surface velocity as the impression-cylinders, after which the web is wound upon a roll 28, actuated by suitable take-up mechanism.

The drawing-rolls 25 and 26 receive their motion from the gear C through suitable intermediate connections. (Not shown.)

Each of the impression-cylinders D is forced upward against the influence of its spring $g$ and kept in contact with the proper numbering wheel or wheels on the disk G, which coöperates therewith by a pair of cam-wheels I I, mounted on the main shaft B, the peripheries of said cam-wheels running in contact with antifriction-rolls $h$, mounted on the sliding boxes $b$ of each impression-cylinder, and each cam-wheel is provided with a notch $i$, into which the roll $h$ opposite thereto drops as soon as the last number has been printed on the ticket by the numbering device placed thereover, thus causing the spring $g$ to withdraw the impression-cylinder out of printing position.

The circumference of each cam-wheel corresponds to the length of the printed ticket to be numbered, so that an entire ticket is numbered, or a portion of the web embodying several tickets side by side according to its width, at each complete revolution of the cam-wheels, and the length of the notch $i$ corresponds to that of the printed heading or blank space between two adjacent railway or other tickets, which enables that portion of the ticket which does not require to be numbered to pass the several sets of numbering devices before the cam-wheels I again lift the impression-cylinders into printing position to print the numbers on the next succeeding ticket on the web drawn from the roll H.

The disks G, which are each provided with a hub 29, are immovably secured to a shaft $k$, journaled in the framework A, each shaft $k$ carrying a gear $m$, Fig. 2, which meshes with and is driven by the large gear C. Each shaft $k$ is also provided with another gear 31, which meshes with a gear 32 on the shaft 20 of the impression-cylinder D beneath, which is thus continuously rotated with the same velocity as the disk G, with which it coöperates. In the machine here shown there are two disks G on each shaft $k$, whereby two tickets printed side by side on the web are numbered at the same time. Each disk G is provided with a series of sets of toothed numbering-wheels $f$, mounted on studs $n$, projecting from the side of said disk G and arranged at equal distances apart around the same near its periphery, as shown in Figs. 5 and 8.

On each of the hubs 29 of the disks G are loosely mounted a series of toothed wheels 33, one for each toothed numbering-wheel of a single set, there being in the present instance six numbering-wheels $f$ placed side by side on each stud $n$ and six toothed wheels 33 on each hub 29, which mesh with said toothed numbering-wheels $f$ and rotate the same to shift the numbers as required, a number or character being placed at the top of each numbering-wheel $f$. To the outer wheel 33 of the series is fastened a star or toothed wheel L, which is mounted to turn on the hub 29. This wheel L is intermittently arrested when the numbering-wheels are to be shifted by means of a pawl 35, secured to a rock-shaft 36, which is provided with an arm 37, Figs. 1, 3, and 4, to which is pivoted a connecting-rod 38, pivoted at its lower end to an arm 39, which in turn is pivoted on a stud 40, said rod 38 having an angular projection 41 at its lower end, which is adapted to be struck and raised by an angular projection 42 on one of the cam-wheels I, said projection 42 being so placed as to operate the pawl 35 at the exact moment when the numbering-wheels are to be shifted to print the next higher number on the ticket. As soon as the projection 42 passes out of contact with the projection 41 the rod 38 is drawn down by a spring $a^2$, Fig. 4, against a stop $b^2$, which withdraws the pawl 35 from the toothed wheel L, which then continues to revolve as before. When the pawl 35 is caused to engage a tooth of the star-wheel L, it temporarily arrests its rotation, while the disk G revolves a distance equal to that between the centers of two adjoining teeth of the wheel L, which causes the numbering-wheels $f$, which are being continuously carried around by the disk G, to be shifted to print the next number by reason of the said numbering-wheels meshing with the teeth of the wheels 33, which are operated by the star-wheel L in a manner which will now be described. The outer wheel 33 of the series, which is fastened to the toothed or star wheel L, meshes with all the units-wheels of the several sets of numbering-wheels, the wheel 33 next to it meshes with all the tens-wheels, the next wheel 33 with all the hundreds-wheels, and so on throughout the entire series.

Next to the first or outer wheel 33 is loosely mounted on the hub 29 a thin toothed wheel 45 (shown in Fig. 13) from one side of which projects a pin 46, which enters a slot 47, Figs. 5 and 13, in the adjoining thick toothed wheel 33, and next to this wheel 33 is another similar thin toothed wheel 45, which is provided with a pin 46 entering a slot 47 in the adjoining thick toothed wheel 33, and so on throughout the entire series, the wheels 45 being alternately interposed between the wheels 33. Each of the thin wheels 45 is provided with a spring-actuated holding pawl or dog 48, which is mounted loosely on one of the studs $n$ of the numbering-wheels, said pawl having at its outer end a notch 49, Figs. 5 and 15, adapted to engage the ends of the teeth of the wheel 45 opposite thereto. Upon another of these studs $n$ is loosely mounted a series of spring-actuated pawls $r$, one for each of the thick toothed wheels 33, the ends of said pawls $r$ being adapted to fit between the teeth of the wheels 33 to hold the same in printing position, while each pawl $r$ is provided at its outer end with a notch $r'$, adapted to engage the ends of the teeth of the wheel 33 opposite thereto, for a purpose to be hereinafter described.

The first or units wheel, which meshes with and is rotated by the outer wheel 33, has riveted to it a thin disk 51, Figs. 6, 11, and 12, which is provided with a single tooth 52, Figs. 6 and 12, which on the units-wheel completing a revolution engages one of the teeth of the thin toothed wheel 45 opposite thereto, moving it a distance of one tooth, which movement is transmitted through a pin 46 and slot 47, as above described, to the adjoining thick toothed wheel 33, which engages the tens-wheel of the numbering-series $f$, and thereby brings the said tens-wheel into printing position. As soon as the tens-wheel has made a complete revolution, a tooth 52 on its side, similar to that on the units-wheel, engages a tooth of the thin wheel 45 opposite thereto and moves it a distance of one tooth, which movement is communicated by means of a pin 46 and slot 47 to the adjoining thick toothed wheel 33, which engages and rotates the hundreds-wheel of the numbering-series and thereby brings the said hundreds-wheel into printing position, and so on throughout the series. The numbering-wheels of one set only of the several series, arranged around a single disk G, require to be provided with teeth 52, as those of the other sets are rotated by the wheels 33, which mesh therewith, but in practice we prefer to provide two or more sets of the numbering-wheels with teeth 52 to render the action of the machine absolutely certain and more widely distribute the strain and wear on the parts. The numbering-wheels of the sets not provided with teeth 52 have thin washers 60, Figs. 9 and 10, placed between them of the same thickness as the pawls 48 and $r$, thereby spacing the numbering-wheels at the desired distance apart, the spaces thus left admitting the said pawls and the springs 62 which actuate them, as shown in Fig. 5.

The slots 47 in the wheels 33 permit the latter to be moved a distance of half a tooth without disturbing the thin toothed wheels 45, from which they derive their motion through the pins 46. This is termed the "half-notch" position, and these slots and pins thus enable any series of the numbering-wheels not required to be used to be pushed around by hand a distance of half a tooth, when they will be out of printing position. With a set of three printing-wheels, for instance, before starting the machine the tens and hundreds wheels will first be moved by hand into half-notch position, so that they will not print when the units-wheel only is being used. Then as each thin wheel 45 is moved, as described, its pin 46 will take up the lost motion until it arrives at the end of the slot in which it fits, (the length of which is equal to about one-half the distance between the centers of two teeth,) when, as it completes its movement, it will carry the adjoining wheel 33 and numbering-wheels meshing therewith into "full-notch" or printing position. The pawls 48 serve to hold the wheels 45 both in full and half notch positions, as the notch 49 fits over the top of a tooth and thus holds the wheel in half-notch position, while the end of the pawl fits between two teeth and thus holds the wheel in full-notch or printing position. In the same manner the pawls $r$ serve to hold the wheels 33 both in full and half notch positions, as the notch $r'$ fits over the top of a tooth and thus holds the wheel in half-notch position, while the end of the pawl fits between two teeth and thus holds the wheel in full-notch or printing position.

In the operation of printing a ticket, the number which is to be repeated on every detachable section of the same is printed on the first section as it passes over the first impression-cylinder. The same number is then printed on the next adjoining section of the ticket as it passes over the second impression-cylinder, the printing device coöperating therewith being properly adjusted to print the numbers as this section is brought beneath it. The third section of the ticket then receives the same number as it passes over the third impression-cylinder, and the same number is printed on the fourth section of the ticket as it passes over the fourth or last impression-cylinder. While one numbering device is printing on one section of the ticket the next numbering device is printing another section of the same ticket at the proper distance therefrom, and in this manner, as the distances between the several numbering devices are properly arranged for the purpose, all of the sections of the ticket are properly numbered in turn, and by this arrangement of mechanism we are enabled to print the numbers as close together as may be desired, which it would manifestly be impossible to accomplish in a machine having a single numbering-head or carrying-disk provided with a series of sets of small numbering-wheels, as such sets could not be arranged close enough together to produce the desired result.

What we claim as our invention, and desire to secure by Letters Patent, is—

1. In a rotary numbering-machine, the combination with the impression-cylinders and a series of rotary disks arranged in the arc of a circle and each carrying a series of circularly-arranged numbering-wheels, of a rotary cam mounted concentric with the series of disks, and change mechanisms for the numbering-wheels on the several disks, all actuated from said cam, substantially as described.

2. In a rotary numbering-machine, the combination with a series of impression-cylinders, of a series of rotating coöperating disks arranged in the arc of a circle and having the same velocity as the said cylinders and each carrying a series of sets of numbering-wheels arranged around its periphery, the numbering-wheels of the several rotating disks and their coöperating impression-cylinders being arranged to print the same number simultaneously on several parts or sections of a continuous ticket or portion of the web, and repeat the same as often as desired in such manner that the same number will be printed at intervals shorter than the distance between the centers of two adjacent or successive sets of numbering-wheels on the same rotary disk, and a single rotary cam concentric with the arc of the numbering-wheel carrying-disks for automatically shifting the numbering-wheels on each carrying-disk after the previous number has been repeated a predetermined number of times to print the next higher number in the same manner, and repeat the same an equal number of times on the succeeding ticket or portion of the web, substantially as described.

3. A rotary numbering-machine, comprising a circularly-arranged series of carrying-disks each provided with a circularly-arranged series of numbering-wheels, a series of impression-cylinders concentric with said series of carrying-disks and movable toward and from the same, and a single large cam-wheel operatively connected with the numbering-wheels of each disk to actuate them and effect the changes, and said cam also acting on the several impression-cylinders to move them toward the numbering-wheels, substantially as described.

4. A rotary numbering-machine, comprising circularly-arranged carrying-disks, each having a circularly-arranged series of numbering-wheels and a hub carrying wheels for effecting the change in the numbering-wheels, a toothed wheel loose on the hub of each carrying-disk and connected with one of the change-effecting wheels, a pawl-and-ratchet mechanism for each of said loose wheels, a series of impression-cylinders concentric with the said series of carrying-disks and movable toward and away therefrom, and a single large cam-wheel actuating the several impression-cylinders and the several pawl-and-ratchet mechanisms of the said loose wheels, substantially as described.

5. A numbering-machine, comprising the frame, the circularly-arranged series of shafts in the upper part thereof and each provided with a carrying-disk provided with a circularly-arranged series of sets of numbering-wheels change mechanisms therefor, a series of impression-cylinder carrying-shafts within and concentric to said series of disk-shafts, movable radially toward and from the same, and geared thereto to revolve at the same rate of speed therewith, a large gear-wheel meshing with pinions on the several disk-shafts, large peripherally-recessed cam-wheels on the same shafts as said large gear and engaging the impression-cylinder shafts to throw them toward the numbering-wheels, and a projection on one of the cam-wheels to successively actuate the change mechanism of all the numbering-wheels substantially as described.

6. In a rotary numbering-machine, the combination with a rotary carrying disk or wheel, of a series of sets of toothed numbering-wheels mounted thereon and arranged around its periphery, the numbering-wheels of one set being each provided on its side with a single tooth or projection, a series of central toothed wheels loosely mounted on the hub of said carrying-disk and meshing with said toothed numbering-wheels, a toothed wheel loosely mounted on the hub of the carrying-disk and adapted to be intermittently arrested when the numbering-wheels are to be shifted, said toothed wheel being immovably fastened to the outer one of said central toothed wheels which mesh with the numbering-wheels, a second series of toothed wheels loosely mounted on the hub of the carrying-disk and interposed alternately between the central toothed wheels of the first-named series and adapted to be engaged by the single teeth or projections on the sides of the numbering-wheels, said first-named series of central toothed wheels being each connected with the adjoining one of the last-named series of central toothed wheels, whereby as one of the first-named series is moved by a numbering-wheel on the completion of its rotation its movement will be transmitted to the adjoining wheel of the last-named series and by said wheel to the next numbering-wheel of each set in the entire series to shift its number, and pawls for holding said toothed wheels in their proper position after each movement of the same, substantially as described.

7. In a rotary numbering-machine, the combination with a rotary carrying-disk or wheel, of a series of sets of toothed numbering-wheels $f$, mounted thereon and arranged around its periphery, the numbering-wheels of one set being each provided on its side with a single tooth or projection 52, a series of central toothed wheels 33, loosely mounted on the hub of the said rotary disk and meshing with the said numbering-wheels, a single outer toothed wheel L, fastened to the outer toothed wheel 33, of the series meshing with the numbering-wheels, a series of toothed wheels 45, interposed alternately between the toothed wheels 33, and each connected with and adapted to transmit motion to the adjoining toothed wheel 33, said wheels 45, being respectively engaged by the teeth or projections 52, of the numbering-wheels as the latter complete their revolutions, pawls for holding the toothed wheels 33, and 45, in their proper positions after each movement of the same, a lever or pawl for intermittently arresting the movement of the wheel L, and means for actuating said pawl at the required times, whereby the numbering-wheels of the entire series of sets mounted on the rotary carrying-disk are simultaneously shifted to bring the next higher number into printing position, substantially as set forth.

8. In a rotary numbering-machine of the character described, the combination with the series of sets of toothed numbering-wheels mounted on a carrying-disk, and the toothed wheels 33, loosely mounted on the hub of said carrying-disk, and meshing with said toothed numbering-wheels, each wheel 33, with the exception of the outer one which drives the units-wheels, having a slot 47, of the interposed toothed wheels 45, actuated by said numbering-wheels, and each provided with a pin 46, entering the slot 47, in the adjoining wheel 33, whereby the latter may be moved a short distance independently of its actuating-wheel 45, to permit the numbering-wheels to be moved into half-notch position, substantially as set forth.

9. In a rotary numbering-machine of the character described, the combination with the series of sets of numbering-wheels mounted on a carrying-disk and arranged around its periphery, and the central toothed wheels 33, and 45, loosely mounted on the hub of the carrying-disk, of the holding-pawls 48, and r, provided at their outer ends with notches adapted to engage the tops of the teeth of said wheels 45, and 33, whereby said pawls are adapted to hold said wheels both in full and half notch positions, substantially as described.

Witness our hands this 14th day of May, A. D. 1895.

FRANCIS MEISEL.
HERMANN C. FISCHER.

In presence of—
P. E. TESCHEMACHER,
A. E. HUMISTON.